(12) United States Patent
Stark et al.

(10) Patent No.: US 6,439,062 B2
(45) Date of Patent: *Aug. 27, 2002

(54) FLOW ANOMALY DETECTOR

(76) Inventors: Stephen T. Stark, 8503 E. 107th St. South, Tulsa, OK (US) 74133; Stephen H. Caldwell, 220 W. 27th, Cheyenne, WY (US) 82001

( * ) Notice: Subject to any disclaimer, the term of this patent is extended or adjusted under 35 U.S.C. 154(b) by 0 days.

This patent is subject to a terminal disclaimer.

(21) Appl. No.: 09/918,386

(22) Filed: Jul. 30, 2001

Related U.S. Application Data

(63) Continuation of application No. 09/195,186, filed on Nov. 18, 1998, now Pat. No. 6,267,013.

(51) Int. Cl.[7] ................................................ G01F 15/06
(52) U.S. Cl. ................................. 73/861.77; 73/861.78; 73/861.91
(58) Field of Search .......................... 73/861.77, 861.78, 73/861.91, 861.74, 861.75, 861.79

(56) References Cited

U.S. PATENT DOCUMENTS 6,267,013 B1 * 7/2001 Stark et al. .............. 73/861.74

* cited by examiner

Primary Examiner—Benjamin R. Fuller
Assistant Examiner—Cory D. Mack
(74) Attorney, Agent, or Firm—Rosenthal & Osha L.L.P.

(57) ABSTRACT

An apparatus for detecting an anomaly in a flowing stream includes a set of blades rotatably suspended in the flowing stream and aligned with a normal flow direction of the flowing stream. The blades are configured to rotate at one rate when the anomaly is present in the flowing stream and to rotate at a different rate when the anomaly is absent from the flowing stream. A device is prescribed for measuring rate of rotation and rotation direction of the blades.

21 Claims, 13 Drawing Sheets

FLOW ANOMALY DETECTOR

CROSS-REFERENCE TO RELATED APPLICATIONS

This application is a continuation of U.S. patent application Ser. No. 09/195,186, filed on Nov. 18, 1998 now U.S. Pat. No. 6,267,013.

BACKGROUND OF INVENTION

1. Field of the Invention

The invention relates generally to an apparatus and method for determining fluid flow patterns. More particularly, the invention relates to an apparatus and method for detecting anomalies in a flowing stream.

2. Background Art

Measurement of fluid flow is an integral part of many industrial processes, and it is necessary to obtain accurate measurements of fluid flow because a small error in measurements will significantly impact control and operating cost of the processes. The rate of flow or quantity of a moving fluid in a closed conduit is typically measured by a flowmeter, e.g., orifice meter, turbine meter, ultrasonic meter, or other devices that respond to flow profile, i.e., velocity distribution in a cross-sectional area of flow. Generally, the accuracy and repeatability of measurements obtained from the flowmeter are influenced by the condition of the measured flow. For best results, the measured fluid must flow through the primary measurement element, e.g., orifice plate in the case of an orifice meter, free of anomalies such as swirl, jetting, irregular flow profile, or other irregular flowing conditions that are unusual, abnormal, nonconforming, or undesirable and which do not meet requirements stipulated by industrial standards or prescribed rules of practice.

FIGS. 1A and 1B illustrate a regular flow profile 10 for fluid flow in a circular pipe 12. As shown, the regular flow profile 10 is parabolic in shape and symmetric about the longitudinal axis 13 of the pipe. Any flow that deviates from this symmetric, parabolic flow profile may be considered to be irregular. FIG. 1C illustrates an example of an irregular flow profile 14 for fluid flow in a circular pipe 16. In a piping system, an irregular flow profile, swirl, or other irregular flowing condition may be the result of upstream pipe lengths, offsets, ridges, bends, elbows, changes in pipe size, and other piping conditions. FIGS. 1D–1H illustrate examples of anomalous flow patterns for various piping conditions in a piping system. Flow profile and swirl may also be induced by valves, flow controllers, pressure reduction equipment, and flow restrictions. Excessive internal pipe wall roughness, irregular or uneven surfaces caused by rust, scale, welding irregularities, fabrication processes, manufacturing imperfections, or pipe wall irregularities may also create irregular or unexpected flow conditions in a pipe, conduit, or other type of equipment.

The exact amount of swirl or flow profile distortion adversely affecting meter performance depends on many variables and is not completely defined. Generally, if the measured flow is a Newtonian fluid, e.g., all gases, most liquids, and most dense-phase fluids associated with the petroleum, petrochemical, natural gas, and other industries, flow profile or swirl can be brought to acceptable limits by providing sufficient straight pipe upstream of the flowmeter. What is considered to be sufficient straight pipe upstream of the flowmeter depends on the type of flowmeter and whether the measured fluid is a liquid or gas. Various standards from American National Standards Institute, International Standards Organization, American Petroleum Institute, American Gas Association, and other organizations have been established to provide practical guidance for determining sufficient upstream pipe length. For example, the American National Standards Institute orifice metering standard ANSI/API 2530 provides detailed information regarding piping requirements upstream and downstream of an orifice plate.

When it is impractical to provide sufficient straight pipe upstream of the flowmeter, flow conditioners are installed at a sufficient distance upstream of the flowmeter to help eliminate or prevent irregular flowing conditions. FIGS. 2A and 2B show examples of flow conditioners that are commonly used to eliminate swirl in a flow. In many instances, these flow conditioners will have little effect on irregular flow profile. However, there are other types of flow conditioners that can eliminate swirl as well as irregular flow profile. Typically, flow conditioners are employed to redirect fluid flow patterns to produce flow profiles that are favorable to the performance of a particular flowmeter or other device when anomalies are present in the flowing stream. In the absence of anomalies in the flowing stream, flow conditioners maintain the current flow pattern and prevent development of flow pattern problems. Again, there are various industrial standards that provide detailed information regarding fabrication and use of various types of flow conditioners.

Flow conditioners can, however, be very expensive. In addition to being expensive, flow conditioners cause additional pressure drop, which results in additional costs because devices, such as compressors and pumps, must work harder and consume more energy to move the same amount of fluid. Therefore, it would be useful to be able to determine if anomalies are present in a flow before purchasing and installing flow conditioners in the piping system. It would also be useful to be able to determine the type and severity of each anomaly, if any, in the flow. By knowing the type and severity of the anomaly in the flow, the appropriate flow conditioner for the detected anomaly can be installed.

There are various methods for detecting anomalies in a flowing stream. One method uses pitot tubes to measure local static and stagnation pressures at various locations in the flow. From the pressure measurements, local flow velocities are then calculated. These local flow velocities may then be used to construct the flow profile, which may be compared to what is considered to be a normal flow profile to determine if there is an anomaly in the measured flow.

Another method for detecting anomalies in a flow involves the use of laser beams. A laser beam is focused on a small-volume element in the flow through an optical lens. Other lenses are positioned to receive the laser beam that is transmitted through the fluid and some portions of the laser beam that get scattered. When a moving particle in the small-volume element scatters the light, the scattered light experiences a Doppler shift in frequency that is directly proportional to the flow velocity. A flow profile may then be obtained by focusing laser beams on a series of small-volume elements in the flowing stream. Again the flow profile may be compared to a normal profile to determine the presence of an anomaly.

Another method for detecting anomalies in a flow involves injecting a marker, such as a colored dye or smoke, in the flow stream. As illustrated in FIG. 3, a marker is injected from a marker source 30 through an opening 32 in a pipe 34. As the fluid moves through the pipe, the marker traces streamlines and allows visual detecting of anomalies, such as swirl or jetting. This method is primarily of qualitative utility in that direct fluid measurements, e.g., flow velocity, are difficult to obtain.

SUMMARY OF INVENTION

In general, in one aspect, an apparatus for detecting an anomaly in a flowing stream comprises a plurality blades rotatably suspended in the flowing stream and aligned with a normal flow direction of the flowing stream. The blades are configured to rotate at one rate when the anomaly is present in the flowing stream and to rotate at a different rate when the anomaly is absent from the flowing stream. The apparatus further comprises means for measuring rate of rotation and rotation direction of the blades.

In another aspect, an apparatus for detecting an anomaly in a flowing stream comprises a blade holding device supported in the flowing stream. The blade holding device defines a central axis aligned with a normal flow direction of the flowing stream. A plurality of blades are arranged about the central axis. The blades are configured to rotate at one rate about the central axis when the anomaly is present in the flowing stream and to rotate at a different rate about the central axis when the anomaly is absent from the flowing stream. The apparatus further comprises means for measuring rate of rotation and rotation direction of the blades.

In yet another aspect, a method for detecting an anomaly in a flowing stream comprises determining a normal flow direction of the flowing stream; configuring a plurality of blades to rotate at one rate when the anomaly is present in the flowing stream and to rotate at a different rate when the anomaly is absent from the flowing stream; suspending the blades in the flowing stream such that the blades are aligned with the normal flow direction; and measuring rate of rotation of the blades.

Other aspects and advantages of the invention will be apparent from the following description and the appended claims.

DETAILED DESCRIPTION

Figure 1A:
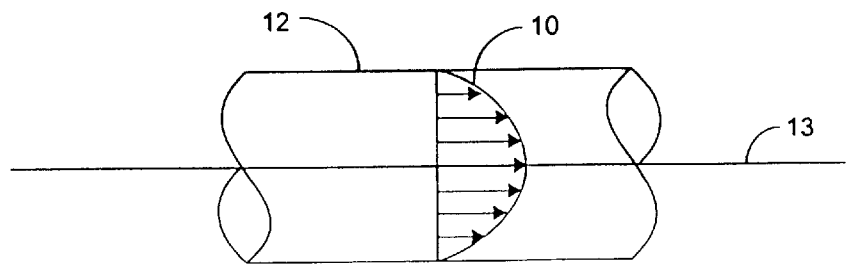
FIGS. 1A–1H show examples of different flow patterns.
Figure 1B:
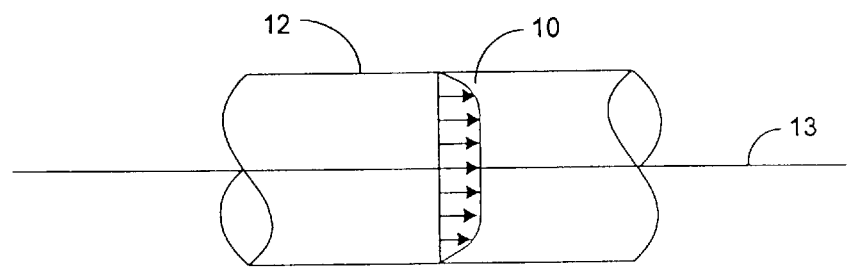
Figure 1C:
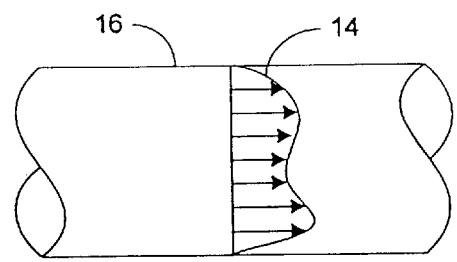
Figure 1D:
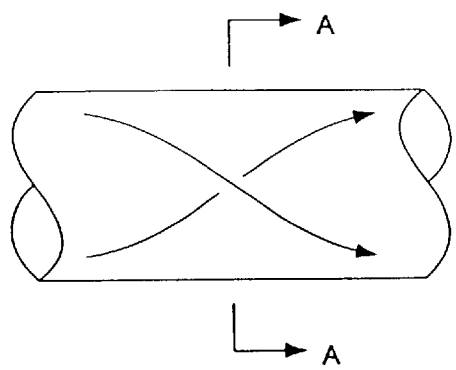
Figure 1E:
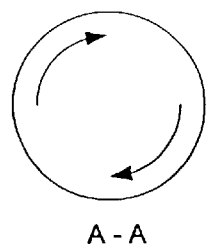
Figure 1F:
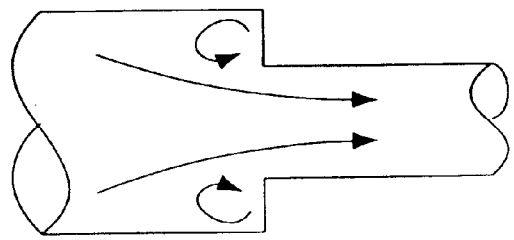
Figure 1G:
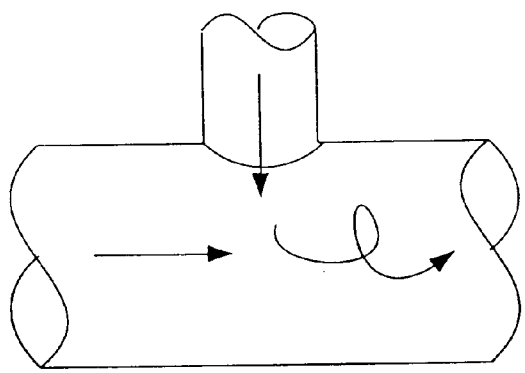
Figure 1H:
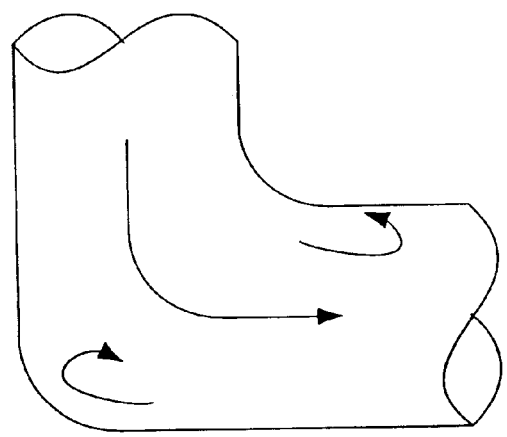
Figure 2A:
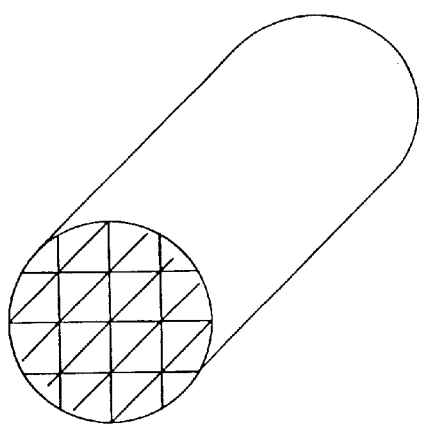
FIGS. 2A and 2B show examples of flow conditioners.
Figure 2B:
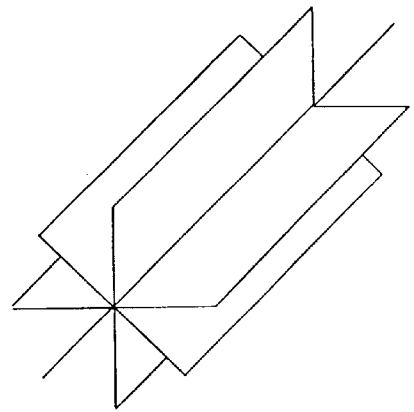
Figure 3:
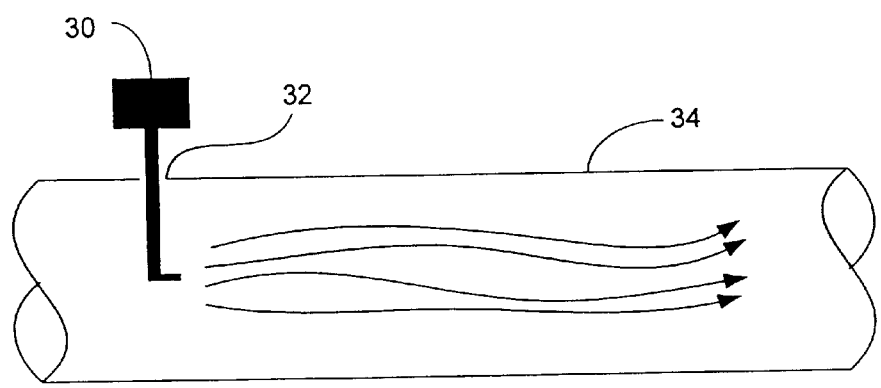
FIG. 3 illustrates a prior art method of detecting flow anomaly.
Figure 4A:
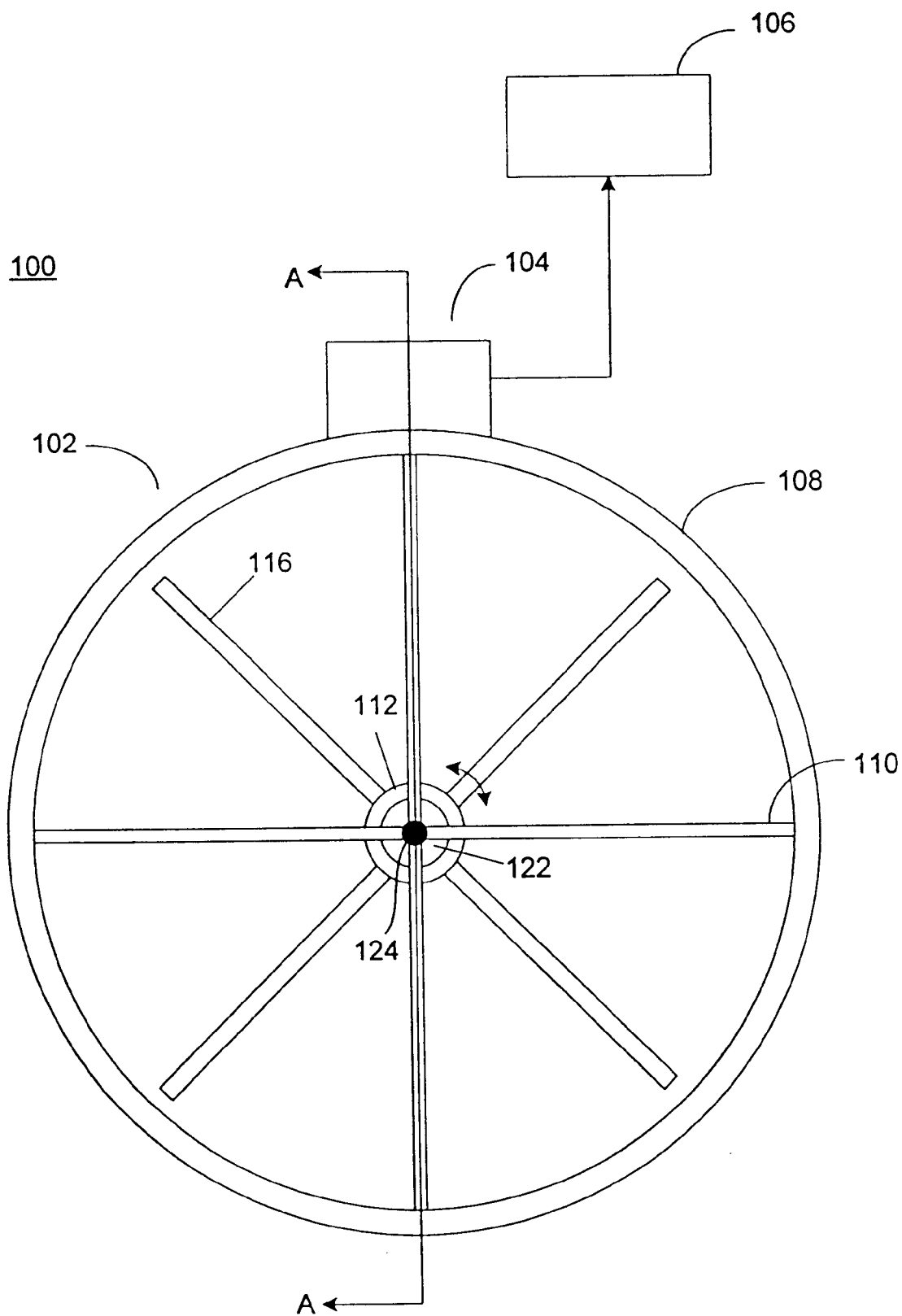
FIG. 4A is a front view of one embodiment of an anomaly detector.
Figure 4B:
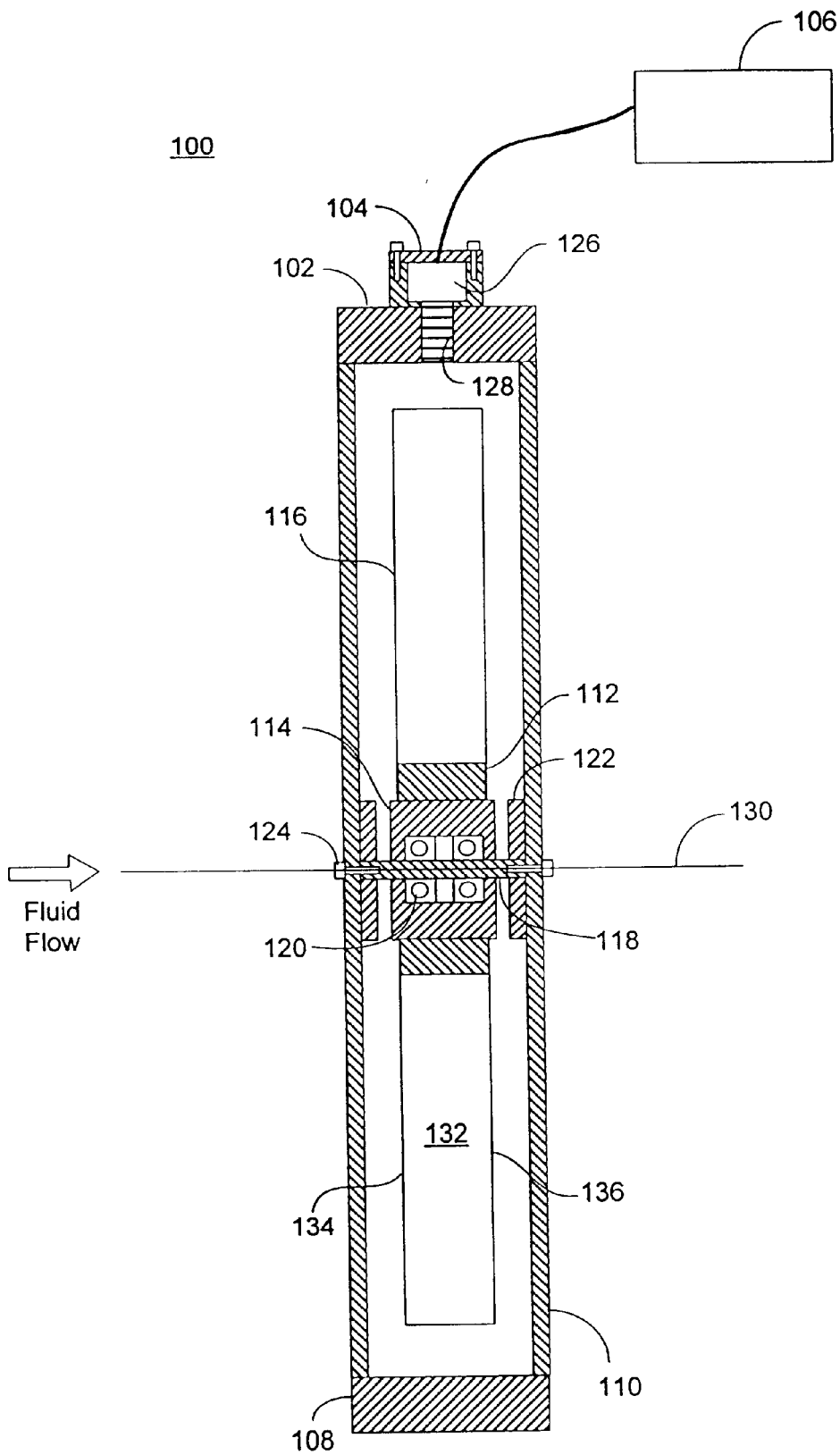
FIG. 4B is a cross-sectional view of the anomaly detector shown in FIG. 4A taken along line A—A.

Referring to the drawings wherein like characters are used for like parts throughout the several views, FIGS. 4A and 4B illustrate an anomaly detector 100 for detecting anomaly in a flowing stream moving through a conduit, e.g., a pipeline, or through or upstream of a flowmeter or other flow device. The anomaly detector 100 comprises a rotor unit 102, a sensor unit 104, and a processing unit 106. The rotor unit 102 includes an annular housing 108 having support members 110 for suspending a rotor 112 in a flowing stream. The rotor 112 is mounted on a central hub 114 and has blades 116 that are fixed radially about the central hub 114. The central hub 114 is rotatably supported on a shaft 118 by bearings 120. The ends of the shaft 118 are disposed in hubs 122 on the support members 110 and held in place by pins 124.

Figure 5A:
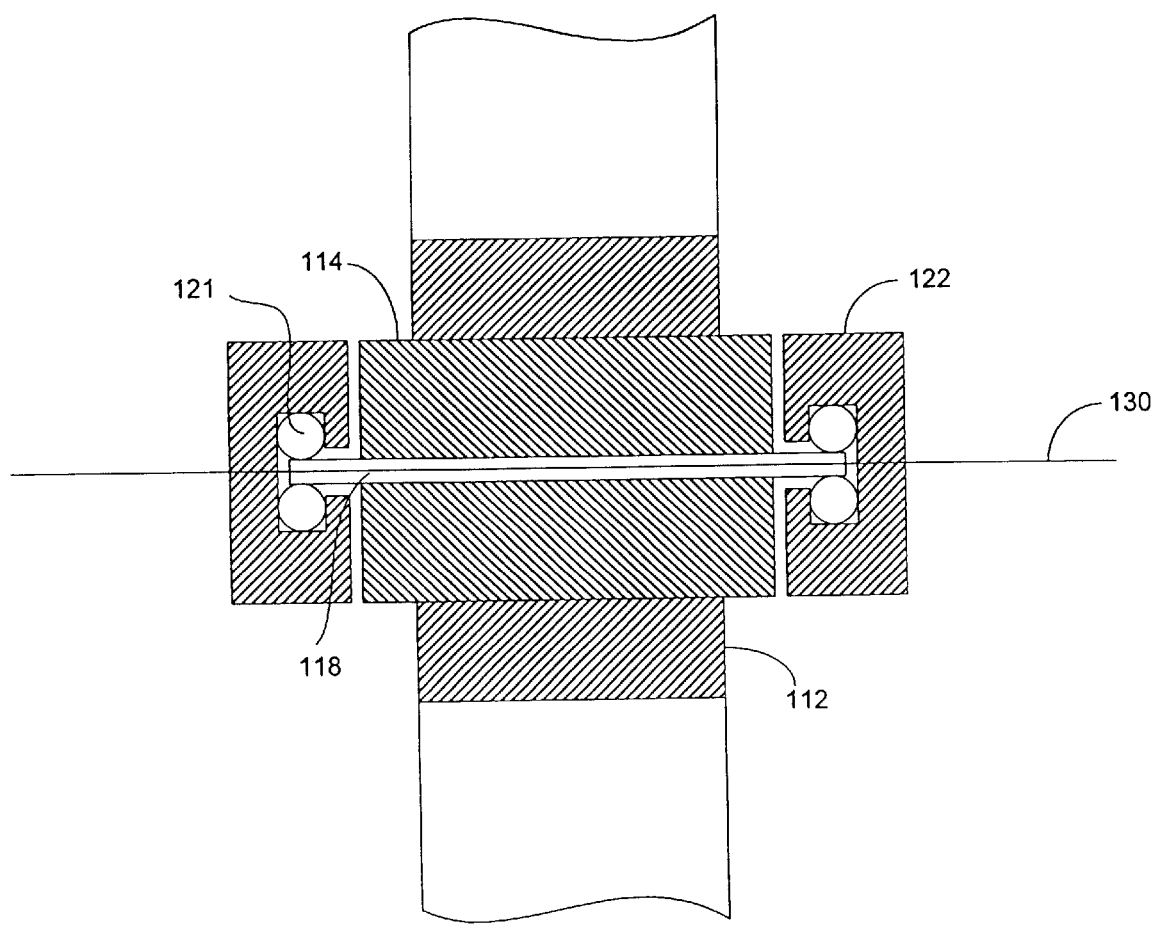
FIGS. 5A and 5B illustrate different methods of rotatably supporting the rotor shown in FIGS. 4A and 4B.
Figure 5B:
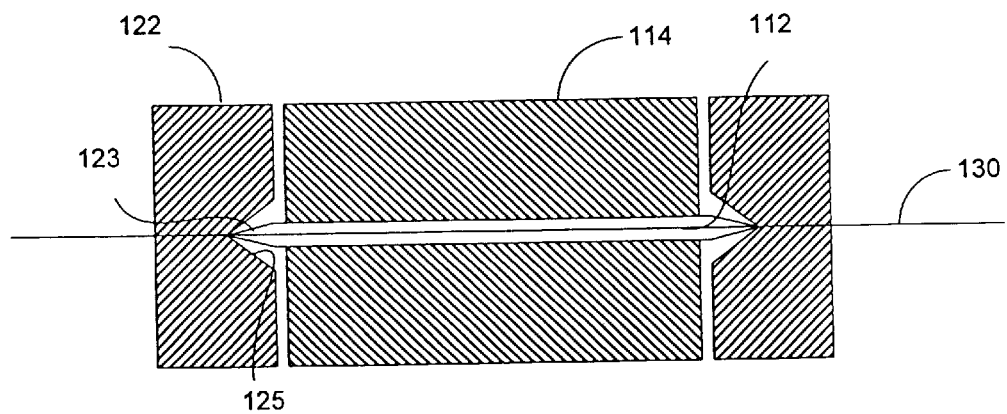

While the rotor 112 is shown as mounted on the central hub 114 and the central hub 114 is shown as supported on the shaft 118 by bearings 120, it should be clear that the rotor 112 may be supported in various ways as long as the rotor is free to spin about its central axis 130. In one embodiment, as illustrated in FIG. 5A, the central hub 114 may be mounted on the shaft 118 without the bearings 120, and the hubs 122 may include bearings for rotatably supporting the ends of the shaft 118. Alternatively, instead of mounting the rotor 112 on the central hub 114, the rotor 112 may be mounted on the rotatably supported shaft 118. In another embodiment, as illustrated in FIG. 5B, the ends of the shaft 118 may be pointed, and the hubs 122 may be provided with recessed portions which cooperate with the pointed ends of the shaft so as to allow the shaft to rotate without the need for bearings.

Referring back to FIGS. 4A and 4B, the sensor unit 104 is mounted on the annular housing 108 and includes a blade position sensor 126 which has an end portion that is received in a conduit 128 in the annular housing 108. The blade position sensor 126 is arranged to detect movement of the blades 116 and to measure the spin rate of the blades 116 as the rotor 112 spins. The spin rate of the blades 116 is proportional to the magnitude of the anomaly in the flowing stream. The measurements made by the blade position sensor 126 are transmitted to the processing unit 106, which further processes the measured data to determine the type and magnitude of anomaly present in the flowing stream. A data gathering apparatus may be provided in the rotor unit 102 to store information representative of the spin rates of the blades 116 during operation of the anomaly detector. Then at a later time, when the rotor unit 102 is removed from the flowing stream, the spin-rate data can be retrieved from the data gathering apparatus and sent to the processing unit for processing.

In one embodiment, the blade position sensor 126 is a magnetic pickup with the pickup coil disposed in the conduit 128 of the annular housing 108. The blades 116 are made of a conductive or magnetic material to facilitate detection by the pickup coil. Alternatively, the blades 116 may be made of a non-conductive, non-magnetic material and include pickup elements, e.g., tabs, inserts, or coatings, which are made of a conductive or magnetic material to facilitate detection by the pickup coil. The magnetic pickup detects movement of the blades 116 and generates signals, e.g., voltages pulses, in response to the movement of the blades. These signals are transmitted to the processing unit 106 and decoded to determine the spin rate of the blades. One way of determining the spin rate of the blades is to count the number of signals sent by per unit time. The processing unit 106 may also determine the spin direction of the rotor, i.e., clockwise or counterclockwise, from the generated signals by using multiple sensors placed at various locations to detect a phase pattern or otherwise characterize flow and current angle and direction.

Figure 6:
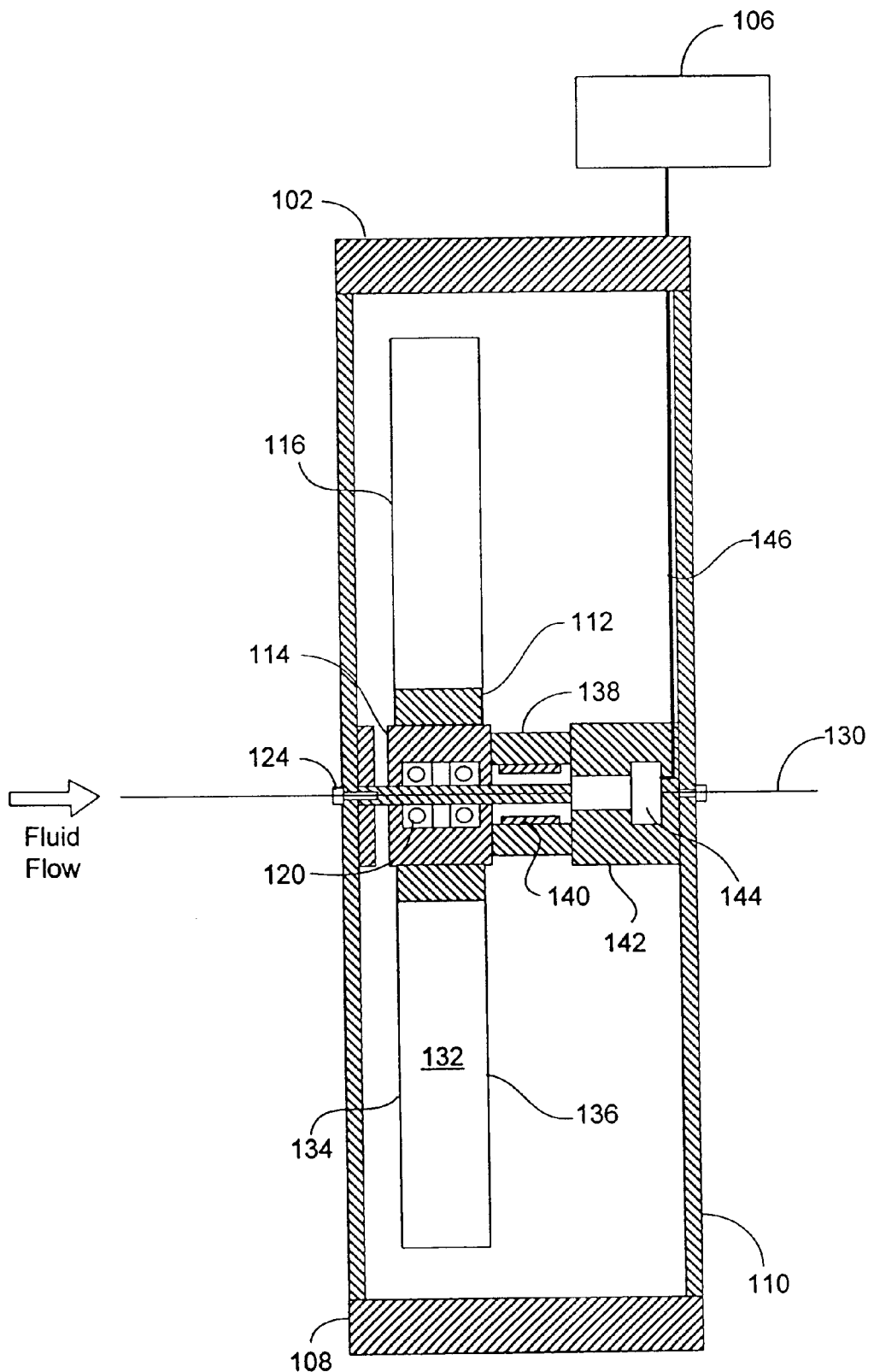
FIG. 6 illustrates another embodiment of the anomaly detector.

Referring to FIG. 6, another embodiment of the anomaly detector is shown with the rotor 112 mounted on the central hub 114 and the central hub 114 rotatably mounted on the shaft 116. A magnet housing 138 is attached to the end of the central hub 114 so as to rotate in unison with the rotor 112. The magnetic housing 138 includes magnets 140. A pickup coil 144 is positioned in a housing body 142 that is attached to one end of the shaft 116. The pickup coil 144 is arranged to detect movement of the magnets 140 as the rotor 112 spins. The output from the pickup coil 144 may be transmitted to the processing unit 106 through electrical wires 146 which extend from the pickup coil 144 to the processing unit 106. As in the previously illustrated embodiment, the processing unit 106 decodes the transmitted data to determine the spin rate, and possibly, the spin direction of the rotor blades.

The anomaly detector has been described with respect to a magnetic pickup sensing blade movement and measuring spin rate of the rotor blades. However, there are other suitable methods of sensing blade movement and measuring spin rate of the blades besides using a magnetic pickup. In one embodiment, an optical sensor or radio frequency transmitter and sensor may be used to measure the spin rate of the blades. An ultrasonic sensor, light reflection, e.g., strobe, with optical sensor, fiber optics, low frequency sound sensors, mechanical switches, and various types of photography are also alternative methods of sensing or recording motion and/or speed and/or direction of the blades. Gear or other mechanically driven devices or methods may also be used to monitor the movement of the blades.

Generally, a flowing stream will advance along a normal flow direction. For a pipe, this normal flow direction would be parallel to the pipe centerline and wall. The flowing stream will also have local flow components that may or may not be aligned with that normal flow direction. When the local flow components that are not aligned with the normal flow direction are significant, the flowing stream may be considered to be anomalous. When the local flow components that are not aligned with the normal flow direction are negligible, the flowing stream may be considered to be non-anomalous. There are instances when the local flow components that are not aligned with the normal fluid direction are negligible but the flow is still anomalous, e.g., a flowing stream whose only significant anomaly is an irregular flow profile.

Referring back to FIGS. 4A and 4B, the rotor blades 116 are arranged about the central hub 114 such that an anomalous flowing stream moving past the rotor 112 impinges on the blades 116 and causes the rotor 112 to spin. The rate at which the rotor 112 spins is dependent on the magnitude of the anomalous component of the flow and the sensitivity of the blades 116 to that anomalous component. Accordingly, the blades 116 should be designed and set to a pitch which define a particular flow anomaly. This blade pitch may be determined during testing and calibration of the anomaly detector.

Ideally, a normal or non-anomalous flowing stream will move past the rotor 112 without impinging on the blades 116, thus leaving the rotor 112 relatively stationary. However, it is expected that vibrations or motions of the blades 116 may occur from time to time due to irregular forces acting on one or more of the blades. In some cases, regular and even high-speed spinning of the rotor 112 may occur under flowing conditions with insignificant flow anomalies. Manufacturing tolerances and limitations and placement of the rotor and blades in a flowing stream are all factors that can affect the response of the rotor blades in a flowing stream. Fluid velocity, density, viscosity, and even pipe size can also cause varying performance levels in the anomaly detector. How the blades respond under a normal flowing condition can be determined during calibration and testing of the anomaly detector and used to distinguish when an anomalous flowing condition is present.

In the illustrated embodiment, the blades 116 are aligned with the central axis 130 of the rotor. In a pipeline, the annular housing 108 would support the rotor 112 such that the central axis 130 is aligned with the centerline of the pipeline. Thus, when a normal flowing stream moves past the blades 116, the rotor 112 may be relatively stationary or may vibrate or move as previously discussed. The rotor 112 spins at a different rate than what may be observed under normal flowing conditions when an anomalous flowing stream moves past the blades 116. Although, the blades 116 are shown as having blunt leading and trailing edges 134 and 136 and flat surfaces 132, it should be clear that this blade profile may be varied to enhance the performance of the anomaly detector in certain flow conditions. For example, the blade edges may be tapered, round, concave, or parabolic. The blade surfaces may be designed with curvature such that the blade has an airfoil, parabolic, or other shape common to slipstream application, e.g., aircraft wing, stabilizer, fin, and deflector.

The blades 116 are also illustrated as evenly spaced about the central hub 114. However, it should be clear that this blade arrangement may be appropriately adjusted to enhance the performance of the anomaly detector. In one embodiment, the blades may be staggered about the central hub. More than one row of blades may also be used in the detector. However, regardless of the number of blades used or how the blades are arranged about the central hub, care must be taken to balance the rotor blades so as not to cause any unintentional spinning of the rotor. Other parameters, such as blade angle, width, length, and thickness, may also be suitably adjusted to increase or decrease the sensitivity of the blade to a particular flow anomaly.

Figure 7A:
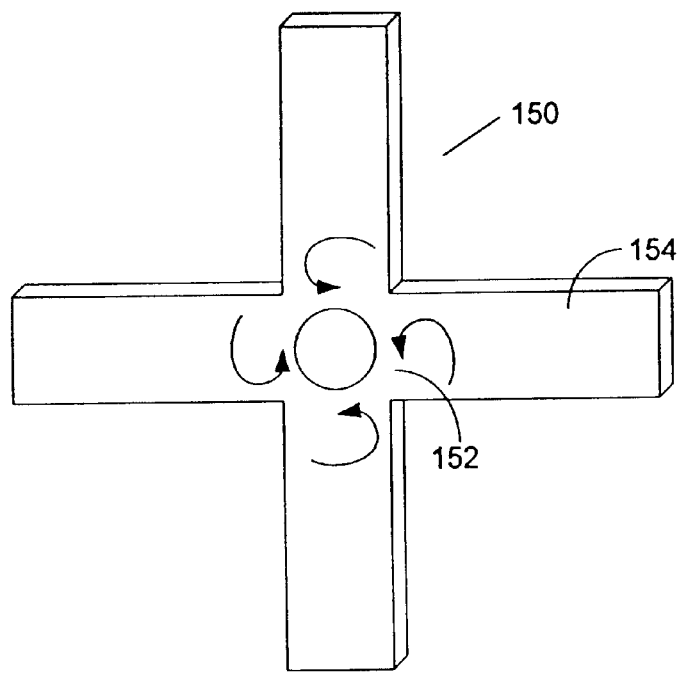
FIG. 7A and 7B illustrate one method of fabricating the rotor shown in FIGS. 4A and 4B.
Figure 7B:
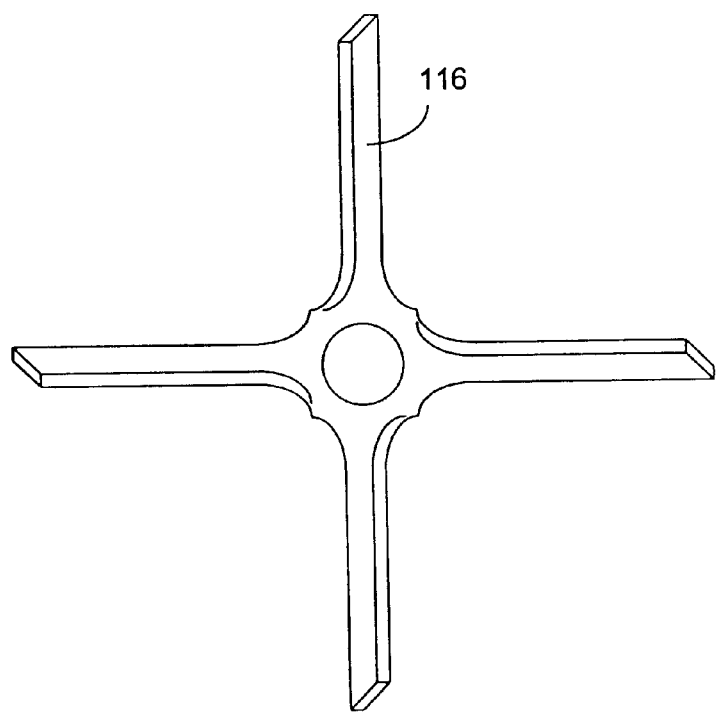
Figure 8A:
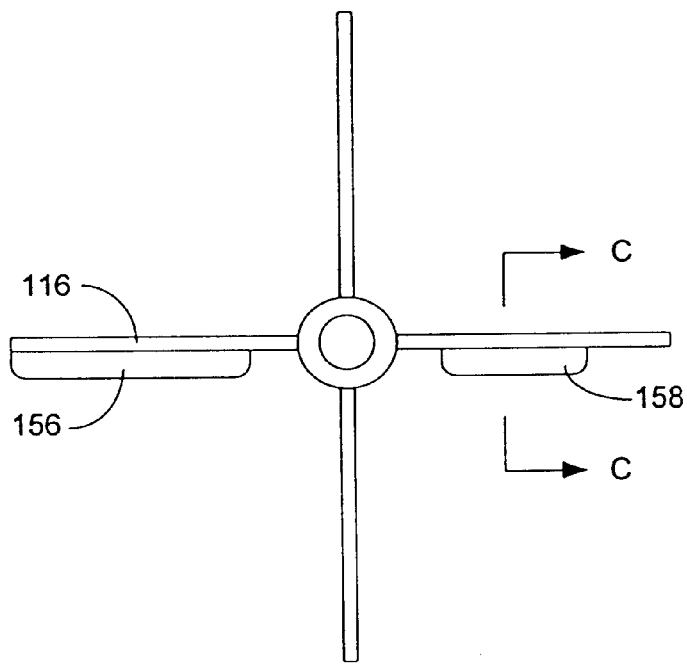
FIGS. 8A and 8B are side views and cross-sectional views of another rotor having airfoils formed on some of its blades.
Figure 8B:
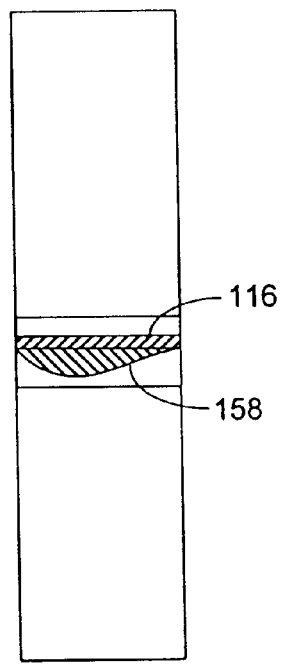

Referring to FIGS. 7A and 7B, the rotor 112 may be formed by stamping or cutting a single piece of sheet metal 150 into the shape of a cross. The base 152 of each arm 154 of the cross 150 may then be twisted ninety degrees to form the rotor blades 116. The rotor 112 may also be formed by molding, casting, or other suitable methods. As shown in FIGS. 8A and 8B, airfoils 156 and 158 may be formed on the blades 116 to add curvature to the blades. It should be noted that the airfoils 156 and 158 may have different dimensions and different degrees of curvature and may be located along different portions of the blades. These variations may allow for more selective detection of specific types of flow anomalies. In general, when airfoils are formed on only some of the rotor blades, care must be taken to balance the design in a manner to provide the desired canceling of rotational forces on the rotor when a balanced, normal flowing stream moves past the rotor blades.

Before using the anomaly detector 100 to detect a particular flow anomaly, the anomaly detector should be calibrated. Although there may be instances when calibration is not necessary. Calibration may be accomplished by suspending the rotor 112 in a flowing stream and determining the response of the rotor to induced flowing conditions. First the rotor 112 is positioned in a normal or desired flowing condition with the blades 116 aligned with the general flow direction or the direction in which a net rotational force does not normally act on the rotor 112. The response of the blades 116, e.g., the spin rate and direction of the blades, to the normal flowing condition is then measured and recorded. Then a flowing condition with a known anomaly is applied to the rotor 112. The response of the blades 116 to the flowing condition with the known anomaly is again measured and recorded. This process is repeated for all the anomalies that are desired to be detected by the anomaly detector.

Different flow patterns cause the blades to spin at different rates and in different directions. The data obtained from applying known flowing conditions to the rotor allows the relationship between spin rate and flow pattern to be determined. Thus, when the anomaly detector is used in an actual flowing condition, the spin rate and direction of the blades can be collected and compared to the data obtained during the calibration of the anomaly detector. This allows the type and magnitude of the flow anomaly to be determined. If the data analysis indicates the presence of a flow anomaly of sufficient severity, then appropriate flow conditioners may be prescribed and installed. In addition, after installation of the flow conditioner, the anomaly detector may be used to determine whether installation of the flow conditioner has sufficiently abated the flow anomaly.

The blade design is very important to the ability of the anomaly detector to detect a particular flow anomaly and may be appropriately adjusted to allow a particular flow anomaly to be detected. For example, the blades 116 shown in FIGS. 4A and 4B may not be able to detect irregular or asymmetrical flow profiles that do not have flow components that are transverse to the normal or non-anomalous flow direction. However, by adding curvature to the blades, the blades may be able to detect irregular flow profiles. FIGS. 8A and 8B show an example of a blade design that may be able to detect irregular flow profiles. This blade design uses airfoils to add curvature to the blades. When blades are designed with curvature, the placement and curvature of the blades should be balanced such that when the fluid flow has a regular profile and is aligned with the normal flow direction, there is no net force acting to rotate the rotor. At the same time, the placement and curvature of the blades should result in a net rotational force on the rotor when the fluid flow has an irregular flow profile.

In operation, after the anomaly detector 100 has been calibrated, the rotor 112 is disposed in a flowing stream such that the rotor blades 116 are aligned with the normal flow direction. In this position, an anomalous flowing stream impinges on the rotor blades 116 as it moves past the rotor 112, causing the rotor 112 to spin. The blade position sensor 126 detects the movement of the blades 116 as the blades move past a line of sight of the sensor. Data representative of the movement of the blades is transmitted to the processing unit 106 in form of signals. The processing unit 106 decodes these signals to determine the spin rate and spin direction of the blades. The spin rate and spin direction of the blades are then compared to the data obtained during calibration of the anomaly detector to determine the type and severity of anomaly present in the flowing stream. If the flow anomaly is sufficiently severe, appropriate actions, such as installing flow conditioners, changing piping configurations, relocating equipment or parts, may be recommended. The anomaly detector may then be subsequently employed to ensure that the appropriate action taken to abate the flow anomaly is effective.

Figure 9:
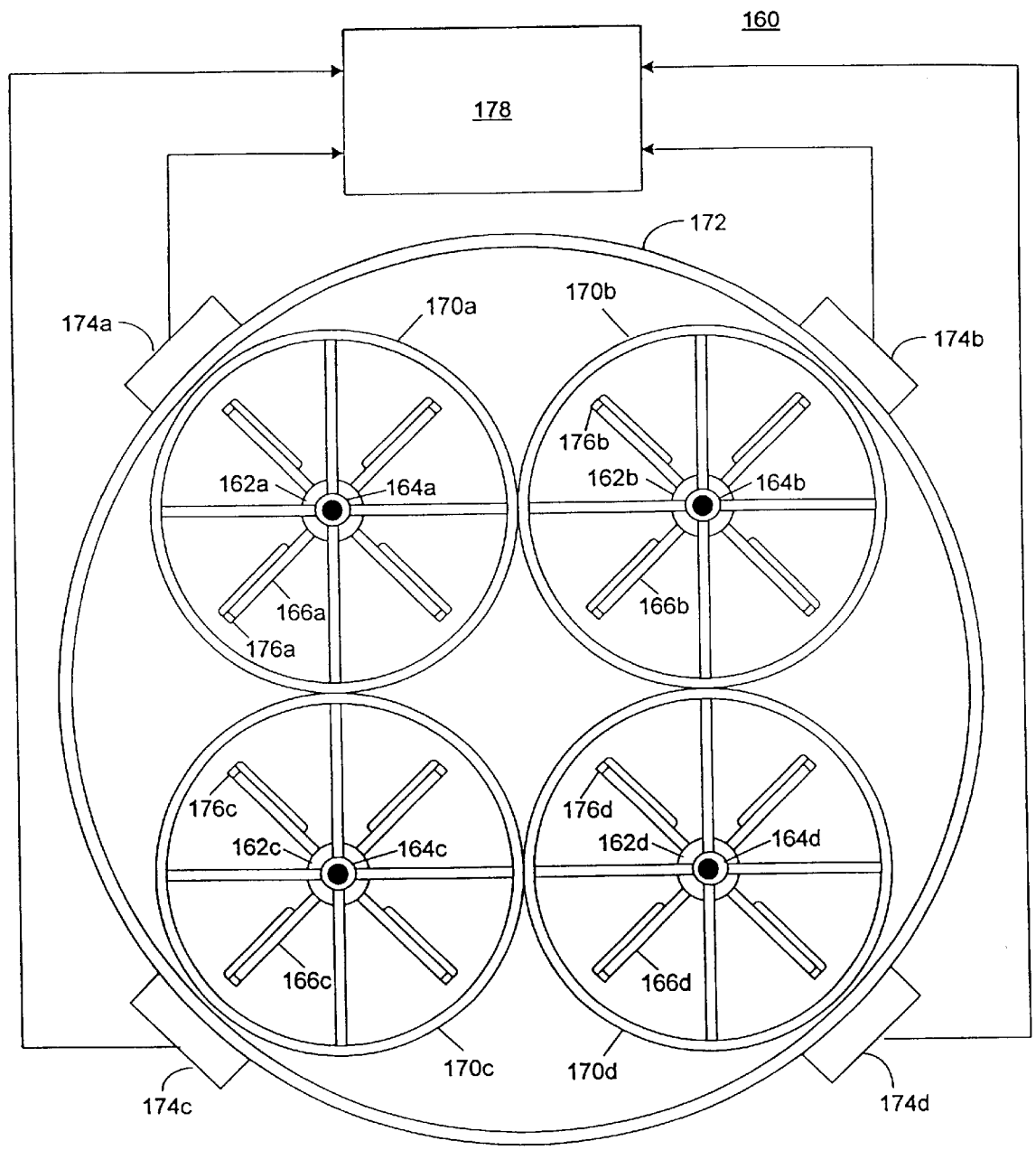
FIG. 9 is a front view of a multiple-rotor anomaly detector.

Referring to FIG. 9, a multiple-rotor anomaly detector 160 comprising rotors 162$a$–$d$ is shown. The rotors 162$a$–$d$ are mounted on central hubs 164$a$–$d$ and have blades 166$a$–$d$ fixed radially about the central hubs 164$a$–$d$. The central hubs 164$a$–$d$ are rotatably supported so as to allow the rotors 162$a$–$d$ to spin freely. The rotors 162$a$–$d$ are suspended within annular sub-housings 170$a$–$d$ in much the same way that the rotor 112 is suspended within the annular housing 108 in FIGS. 4A and 4B. The sub-housings 170$a$–$d$ are in turn mounted in a main annular housing 172. Sensor units 174$a$–$d$ are mounted on the main housing 172. These sensor units 174$a$–$d$ include blade position sensors which are arranged to detect movement of the rotor blades 166$a$–$d$. The rotor blades 166$a$–$d$ are provided with pickup tabs 176$a$–$d$ which facilitate detection of movement of the blades by the blade position sensors in the sensor units 174$a$–$d$. The blade position sensors of the sensor units 174$a$–$d$ are in communication with a processing unit 178 so as to allow data representative of the spin rate of the blades 166$a$–$d$ to be transmitted to the processing unit in the manner previously described.

The main difference between the multiple-rotor anomaly detector 160 and the single-rotor anomaly detector 100 is that the additional rotors in the anomaly detector 160 allow the anomaly detector 160 to detect flow anomalies with a lesser or greater degree of resolution in some instances. For example, localized flow anomalies, or very slight flow anomalies that exist only in a certain section of a flow, may be more readily detected with multiple rotors than with a single rotor. The multiple-rotor anomaly detector 160 operates similarly to the single-rotor anomaly detector 100. However, in addition to using individual rotor spin rates and directions to detect anomaly, the anomaly detector 160 may also use differences in spin rates and directions of the multiple rotors to determine the type of flow anomalies in a flowing stream. This feature is particularly useful in detecting the presence of irregular profiles in a flowing stream.

The anomaly detector described thus far may be used to indicate flow anomalies inside closed conduits, such as pipelines, or inside meters, such as orifice meter, turbine meter, and ultrasonic meter. The anomaly detector may also be usable in non-round conduit, such as air ducts, irregularly shaped vents, flues, etc. The embodiments illustrated in FIGS. 10–13 show how the anomaly detection may be positioned in a conduit or meter to detect flow anomaly.

Figure 10:
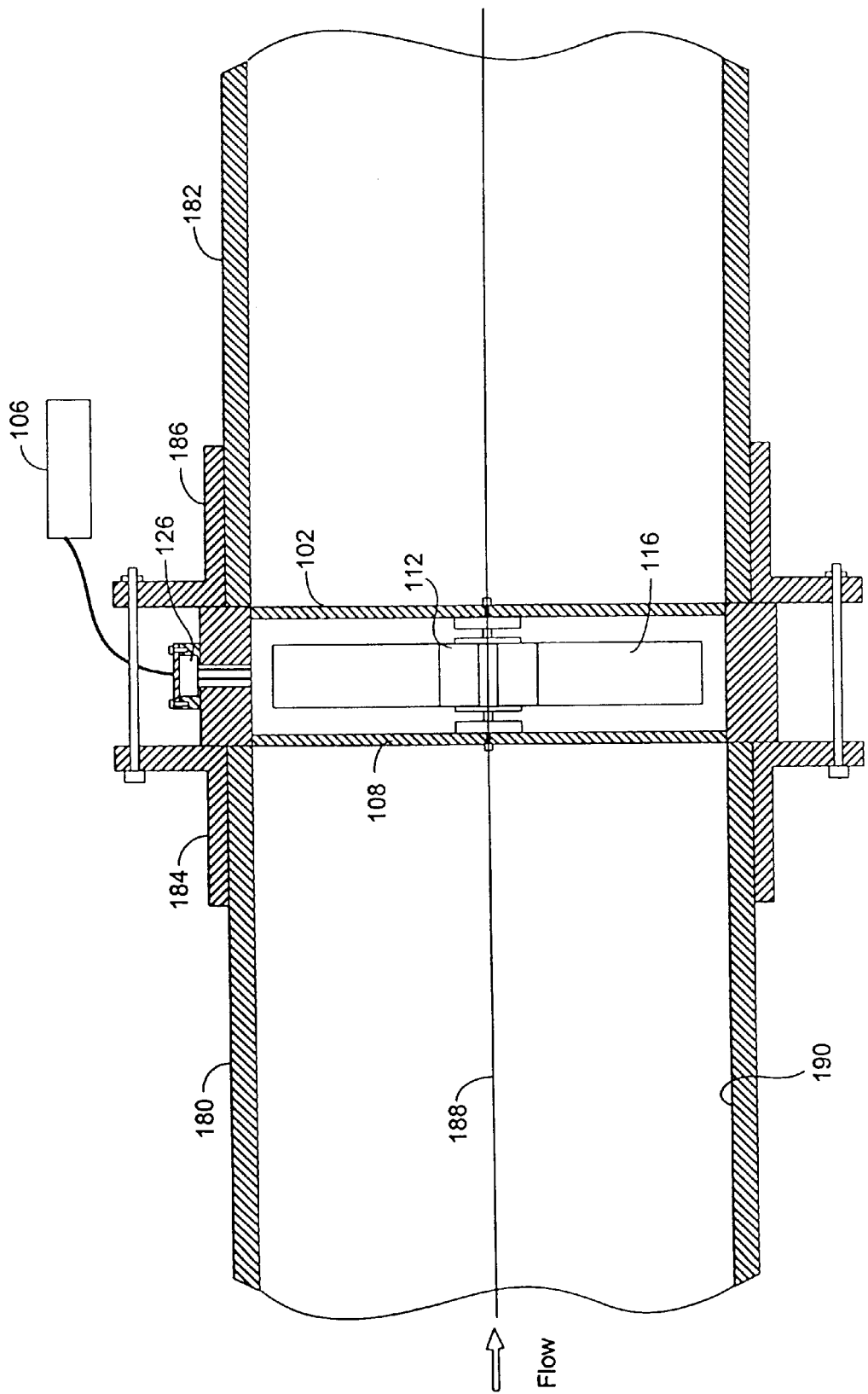
FIG. 10 shows the anomaly detector of FIGS. 4A and 4B mounted between two pipes.

Referring to FIG. 10, the rotor unit 102 of the anomaly detector 100 is mounted between pipes 180 and 182 by flanges, e.g., orifice flanges, 184 and 186. Alternate methods of mounting the rotor unit 102 between the pipes 180 and 182 may also be used. In one embodiment, the annular housing 108 of the rotor unit 102 may be provided with ends that can be welded to the pipes or may have threaded ends that can engage similarly threaded ends on the pipes. The central axis of the rotor 112 is aligned with the centerline 188 of the pipeline so that the blades 116 are aligned with the normal flow direction of a flowing stream moving through the pipeline.

In operation, a normal flowing stream moving parallel to the centerline 188 and pipe wall 190 moves past the blades 116 leaving the rotor 112 relatively stationary. However, as noted earlier, normal occurring eddies and currents in the normal flowing stream as well as other factors may cause vibrations or motions of the rotor 112. An anomalous flowing stream having flow components that are transverse to the centerline 188 and/or wall 190 impinges on the blades 116 and causes the rotor 112 to spin at a different rate from what may be observed under normal flowing conditions. As the rotor 112 spins, the blade position sensor 126 detects the movement of the blades and transmits information that is representative of the spin rate and spin direction of the blades to the processing unit 106. The processing unit 106 in turn processes the transmitted data to determine the type and severity of the anomaly present in the flowing stream.

Figure 11A:
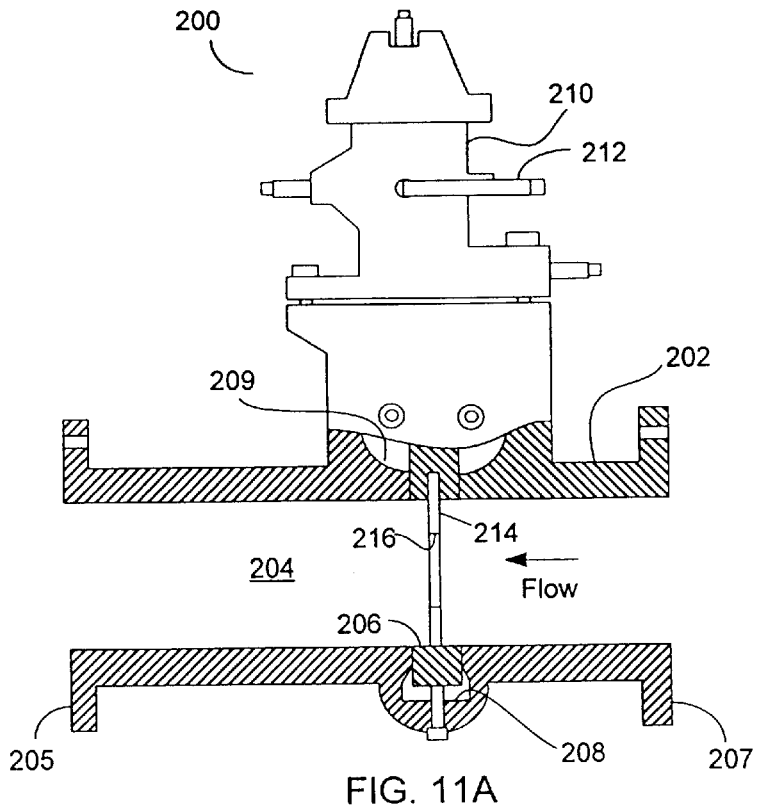
FIG. 11A shows a cross-sectional view of a dual-chamber orifice fitting.

Referring to FIG. 11A, an example of an orifice fitting, e.g., dual-chamber orifice fitting 200, is illustrated. The dual-chamber orifice fitting 200 includes a body 202 having an axial flow passage 204. Flanges 205 and 207 are formed on either ends of the body 202 to permit connection of the flow passage 204 to a pipeline (not shown). An orifice plate holder 206 has a lower end located in a receptacle 208 in the body 202 and an upper end located in a chamber 209 in the body 202. A housing 210 is mounted on the body 202. The housing 210 includes a chamber through which the orifice plate holder 206 may be removed from the body 202. The chamber in the housing 210 provides an additional volume that allows the orifice plate holder 206 to be removed from the body 202 without having to shut the flow through the pipelines. A gear mechanism (not shown) which is operated by a handle 212 is provided to move the orifice plate holder 206 in and out of the body 202. The orifice plate holder 206 suspends an orifice plate 214 in the flow passage 204.

Figure 11B:
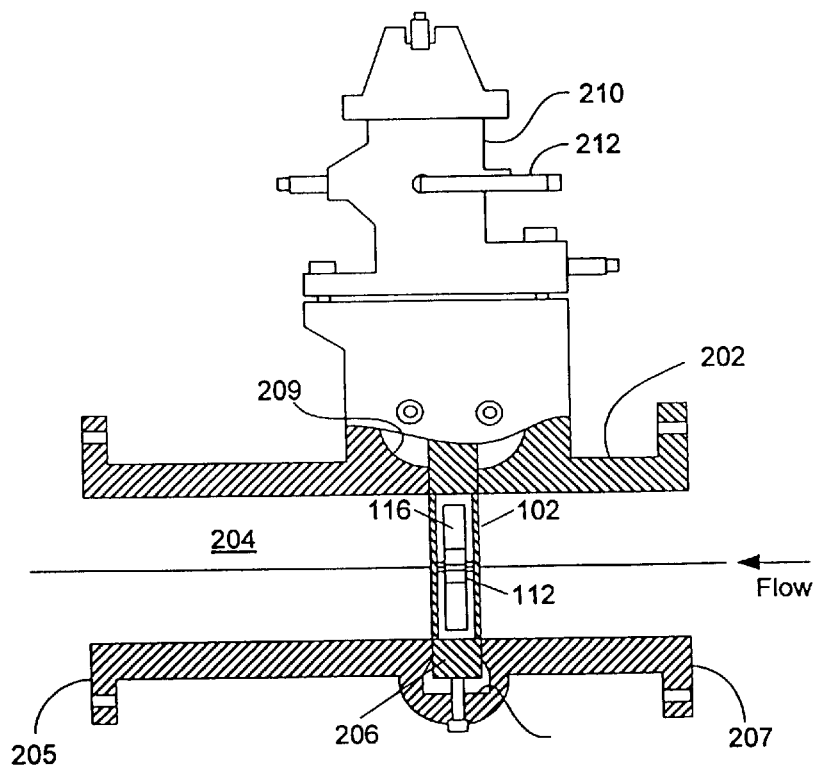
FIG. 11B shows the orifice plate shown in FIG. 11A replaced with an anomaly detector.

In operation, a pressure differential is developed across the upstream and downstream sides of the orifice 216 in the orifice plate 214. This pressure differential can be detected and measured, and the measured data, along with other flow parameters, can be used to calculate the quantity of fluid moving through the pipeline. In FIG. 11B, the orifice plate 214 has been replaced with the rotor unit 102 of the anomaly detector. The rotor blades 116 are aligned with the axial axis of the flow passage 204 so that an anomalous flowing stream moving past the rotor blades 116 causes the rotor 112 spins. The rotor spin rate and direction are detected through the various mechanical parts of the orifice plate holder 206.

By inserting the rotor unit 102 of the anomaly detector into the orifice fitting, the condition of the fluid flowing through the orifice fitting can be determined to ensure that the orifice fitting or meter produces accurate and predictable measurements. While the rotor unit 102 is shown as mounted in a dual-chamber orifice fitting, it should be clear that the rotor unit 102 is equally adaptable to other orifice fittings, e.g., single-chamber orifice fitting.

Figure 12:
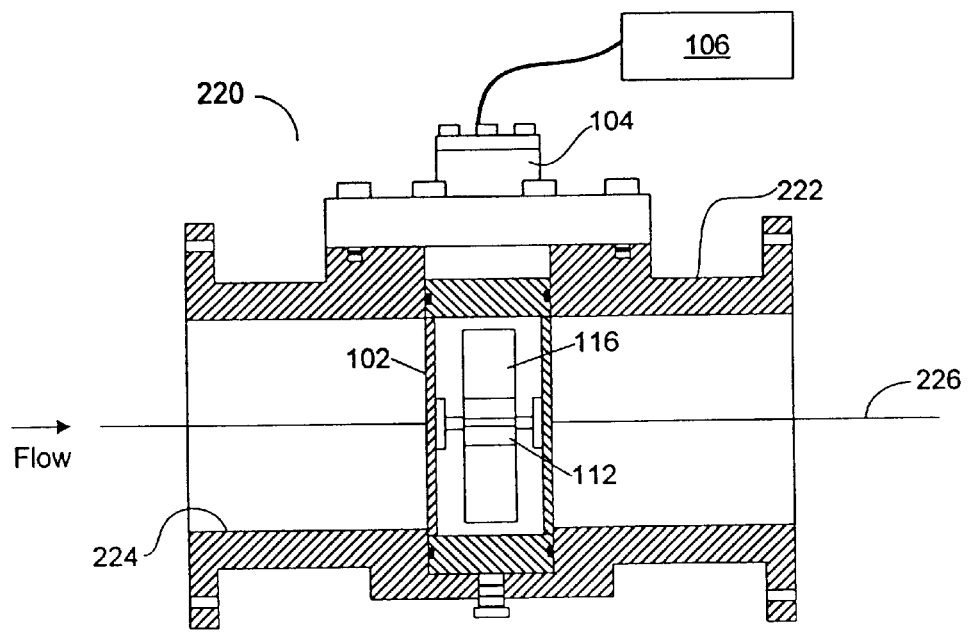
FIG. 12 shows the primary measurement elements of a turbine meter replaced with the rotor unit of an anomaly detector.

Referring to FIG. 12, the primary measurement element of a turbine meter 220 has been replaced with the rotor unit 102 of the anomaly detector 100. The turbine meter 220 includes a housing body 222 having an axial flow passage 224 therein. Typically, the primary measurement element of the turbine meter 200 is a rotor (not shown) that is suspended in the axial flow passage 224. The rotor has blades that are positioned at precise angles to the flow stream such that when fluid moves past the rotor blades, the fluid impinges on the rotor blades and causes the rotor to rotate. The angular velocity of the rotor, which is proportional to the fluid velocity, is then measured and used to determine the quantity of fluid moving through the turbine meter. However, in the illustrated embodiment, the primary measurement element of the turbine meter 200 has been replaced with the rotor unit 102 so as to allow anomaly in a flowing stream through or upstream of the axial flow passage 224 to be determined. As shown, the annular housing 108 of the rotor unit 102 is supported in the flow passage 224 such that the rotor blades 116 are aligned with the axial axis 226 of the flow passage 224.

The anomaly detector 100 operates to detect anomaly in fluid flow through the flow passage 224 in the manner previously described. The rotor 112 of the rotor unit 102 rotates when an anomalous fluid moves through the axial flow passage 224. In an alternate embodiment, instead of replacing the primary measurement element of the turbine meter or other meter with the rotor unit 102, the anomaly detector may be incorporated with the turbine meter to allow simultaneous detection of an anomaly in fluid and measurement of quantity of fluid moving through the flow passage 224.

Figure 13:
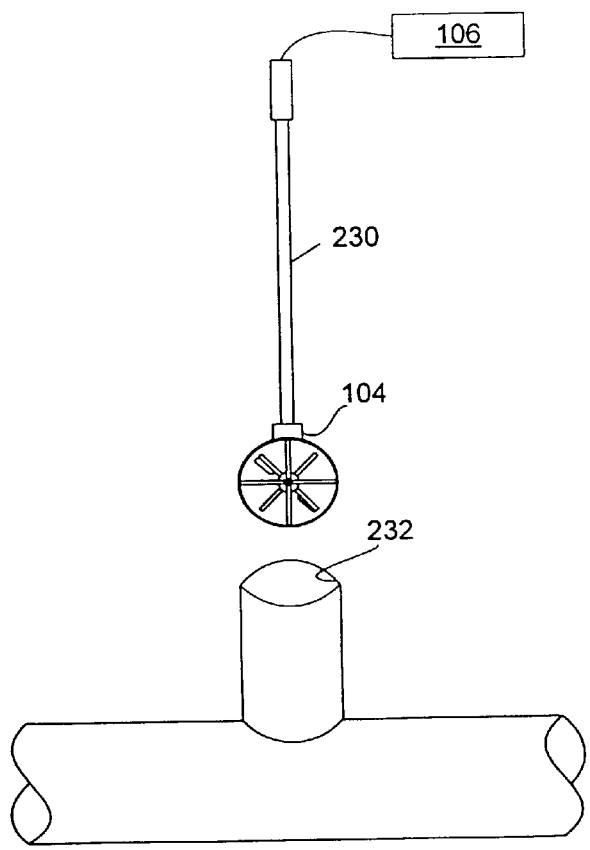
FIG. 13 shows an anomaly detector mounted on the end of a probe.

Referring to FIG. 13, the anomaly detector 100 may be attached to an end of a probe 230 and inserted into an opening 232 in a conduit or meter tube or the like to detect anomaly in a flowing stream. The opening 232 and probe 230 are preferably designed such that the rotor 112 is properly positioned in the flowing stream to allow a particular flow anomaly to be detected in the manner previously described. The sensor unit 104 is connected to the processing unit 106 as in previously illustrated embodiments and data representative of the spin rate of the rotor blades 116 can be transmitted through the probe 230, or other means, to the processing unit for further processing.

From the foregoing description, it is clear that the anomaly detector can be mounted in any meter or device or placed between two flanges or pipe sections to detect flow anomaly in a pipeline, meter, or other device. It is important that the blade on the rotor be set to a pitch which would define a particular anomaly. This pitch is established during calibration of the anomaly detector. In this way, when the central axis of the rotor is aligned with the normal or non-anomalous flow direction, an anomalous flowing stream moving past the rotor causes the rotor to spin with a spin rate and in a spin direction that can be decoded to determine the type of anomaly present in the flowing stream.

While the invention has been described with respect to a limited number of embodiments, those skilled in the art will appreciate numerous variations therefrom without departing from the spirit and scope of the invention. For example, the rotor unit is not limited to the circular shape of the annular housing shown, but this shape may be altered depending on the configuration of the conduit, meter, or other device in which the rotor is disposed. In some embodiments, the annular housing 108 may not be needed and may be dispensed with as long as the rotor 112 is adequately supported. The support members 110 may also take on other configurations, e.g., a "Y" configuration. The hubs may also have a cone shape, a nozzle shape, or other non-planar shape to enhance the performance of the anomaly detector. A flow detector or nose cone may also be placed at the upstream end of the rotor to increase the velocity as it moves past the rotor. This increase in velocity increases the rotor driving force when the fluid moving past the rotor is anomalous. Accordingly, the scope of the invention should be limited only by the attached claims.

What is claimed is:

1. A method of detecting an anomaly in a flowing stream using at least two rotors, the method comprising:

determining a response of each of the at least two rotors to an induced flowing condition with a known anomaly;

positioning the at least two rotors in the flowing stream and determining a response of each of the at least two rotors to the flowing stream; and comparing the response of each of the at least two rotors in the flowing stream to the response of each of the at least two rotors in the induced flowing condition to determine whether the known anomaly is present in the flowing stream.

2. The method of claim 1, wherein the comparing further comprises comparing a response of one of the at least two rotors to a response of a different one of the at least two rotors to determine whether localized anomalies are present in the flowing stream.

3. The method of claim 2, further comprising repeating the comparing to determine whether localized flow anomalies are present proximate each of the at least two rotors.

4. The method of claim 2, wherein the comparing further comprises comparing a spin rate of one of the at least two rotors to a spin rate of a different one of the at least two rotors.

5. The method of claim 2, wherein the comparing further comprises comparing a spin direction of one of the at least two rotors to a spin direction of a different one of the at least two rotors.

6. The method of claim 1, wherein determining the response of each of the at least two rotors to the induced flowing condition comprises measuring spin rates of each of the at least two rotors.

7. The method of claim 6, wherein determining the response of each of the at least two rotors in the flowing stream comprises measuring spin rates of each of the at least two rotors.

8. The method of claim 7, wherein comparing the response of each of the at least two rotors in the flowing stream to the response of each of the at least two rotors in the induced flowing condition comprises comparing the spin rates of each of the at least two rotors in the flowing stream to the spin rates of each of the at least two rotors in the induced flowing condition.

9. The method of claim 1, wherein determining the response of each of the at least two rotors to the induced flowing condition comprises measuring spin directions of each of the at least two rotors.

10. The method of claim 9, wherein determining the response of each of the at least two rotors in the flowing stream comprises measuring spin directions of the at least two rotors.

11. The method of claim 10, wherein comparing the response of each of the at least two rotors in the flowing stream to the response of each the at least two rotors in the induced flowing condition comprises comparing the spin directions of each of the at least two rotors in the flowing stream to the spin directions of each of the at least two rotors in the induced flowing condition.

12. The method of claim 1, wherein positioning the at least two rotors in the flowing stream comprises aligning the at least two rotors with a normal flow direction of the flowing stream.

13. The method of claim 1, wherein the at least two rotors comprise a plurality of blades.

14. The method of claim 13, wherein determining the response of the at least two rotors to the induced flowing condition comprises adjusting an arrangement of the blades on at least one of the at least two rotors with respect to a center of rotation of the at least one rotor so that a selected response of the at least two rotors to the induced flowing condition is achieved.

15. The method of claim 13, wherein determining the response of the at least two rotors to the induced flowing condition comprises adjusting a pitch of the blades on at least one of the at least two rotors so that a selected response of the at least two rotors to the induced flowing condition is achieved.

16. The method of claim 13, wherein determining the response of the at least two rotors to the induced flowing condition comprises adjusting a shape of the blades on at least one of the at least two rotors so that a selected response of the at least two rotors to the induced flowing condition is achieved.

17. An apparatus for detecting an anomaly in a flowing stream, comprising:
 at least two rotors having known spin rates in an induced flowing condition with a known anomaly, each of the at least two rotors having a plurality of blades for suspension in and alignment with a normal flow direction of the flowing stream;
 means for measuring spin rates of the at least two rotors in the flowing stream; and
 means for comparing the spin rates of the at least two rotors in the flowing stream to the known spin rates to determine whether the anomaly is present in the flowing stream.

18. The apparatus of claim 17, further comprising means for comparing spin rates of each of the at least two rotors in the flowing stream to known spins rates of each of the at least two rotors to determine whether the anomaly is a localized anomaly.

19. The apparatus of claim 17, wherein the at least two rotors have known spin directions in the induced flowing condition.

20. The apparatus of claim 19, further comprising means for measuring spin directions of the at least two rotors in the flowing stream.

21. The apparatus of claim 20, further comprising means for comparing spin directions of each of the at least two rotors in the flowing stream to known spin directions of each of the at least two rotors to determine whether the anomaly is a localized anomaly.

* * * * *